N. W. YOUNG.
FEEDER FOR BALING PRESSES.
APPLICATION FILED MAY 20, 1911.

1,027,966.

Patented May 28, 1912.
7 SHEETS—SHEET 1.

Witnesses:

Inventor,
Morris W. Young
By
Attorney.

N. W. YOUNG.
FEEDER FOR BALING PRESSES.
APPLICATION FILED MAY 20, 1911.

1,027,966.

Patented May 28, 1912.

Witnesses:

Inventor,
Norris W. Young,
By
Attorney.

N. W. YOUNG.
FEEDER FOR BALING PRESSES.
APPLICATION FILED MAY 20, 1911.

1,027,966.

Patented May 28, 1912.

Witnesses:

Inventor,
Morris W. Young.
By
Attorney.

N. W. YOUNG.
FEEDER FOR BALING PRESSES.
APPLICATION FILED MAY 20, 1911.

1,027,966.

Patented May 28, 1912.
7 SHEETS—SHEET 6.

UNITED STATES PATENT OFFICE.

NORRIS W. YOUNG, OF WILSONVILLE, OREGON.

FEEDER FOR BALING-PRESSES.

1,027,966. Specification of Letters Patent. Patented May 28, 1912.

Application filed May 20, 1911. Serial No. 628,449.

*To all whom it may concern:*

Be it known that I, NORRIS W. YOUNG, a citizen of the United States, residing at Wilsonville, in the county of Clackamas and State of Oregon, have invented certain new and useful Improvements in Feeders for Baling-Presses, of which the following is a specification.

This invention relates to improvements in feeders for baling presses, and has for its object to provide a feeder which will automatically carry and deliver hay to a baling press. I accomplish these objects by the mechanism illustrated in the accompanying drawing, in which—

Fig. 2 is a plan view of a feed regulator. Fig. 6 is a top plan showing feed plunger and carriers.

In each of the several views similar characters of reference indicate similar parts.

Figure 1:
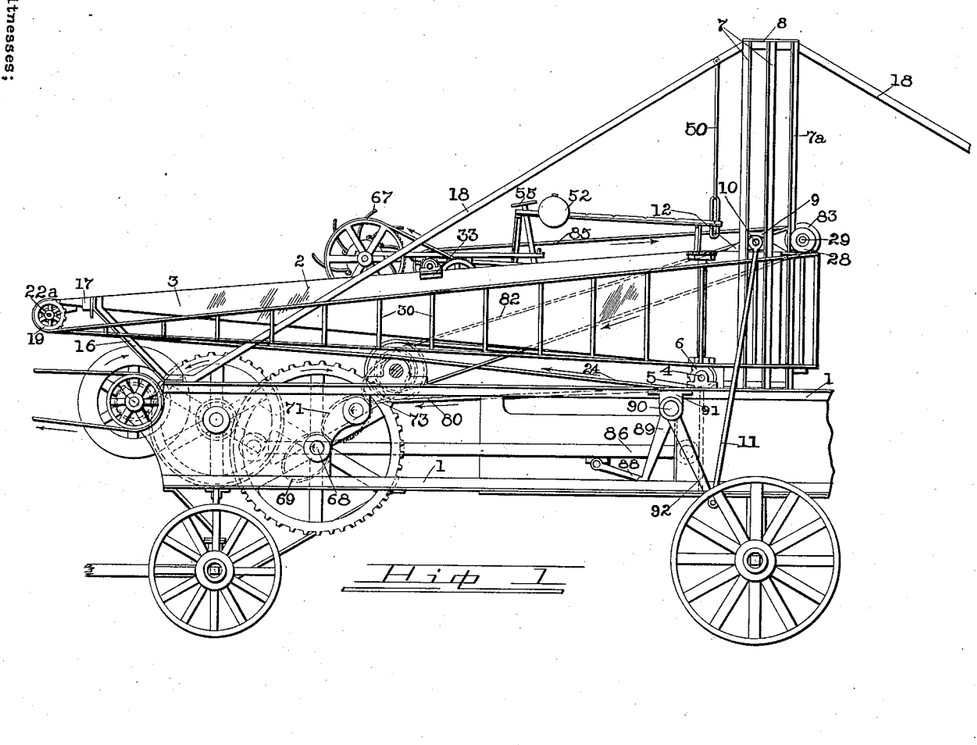
Figure 1 is a side elevation of a baling press, with feed mechanism attached.
Figure 7:
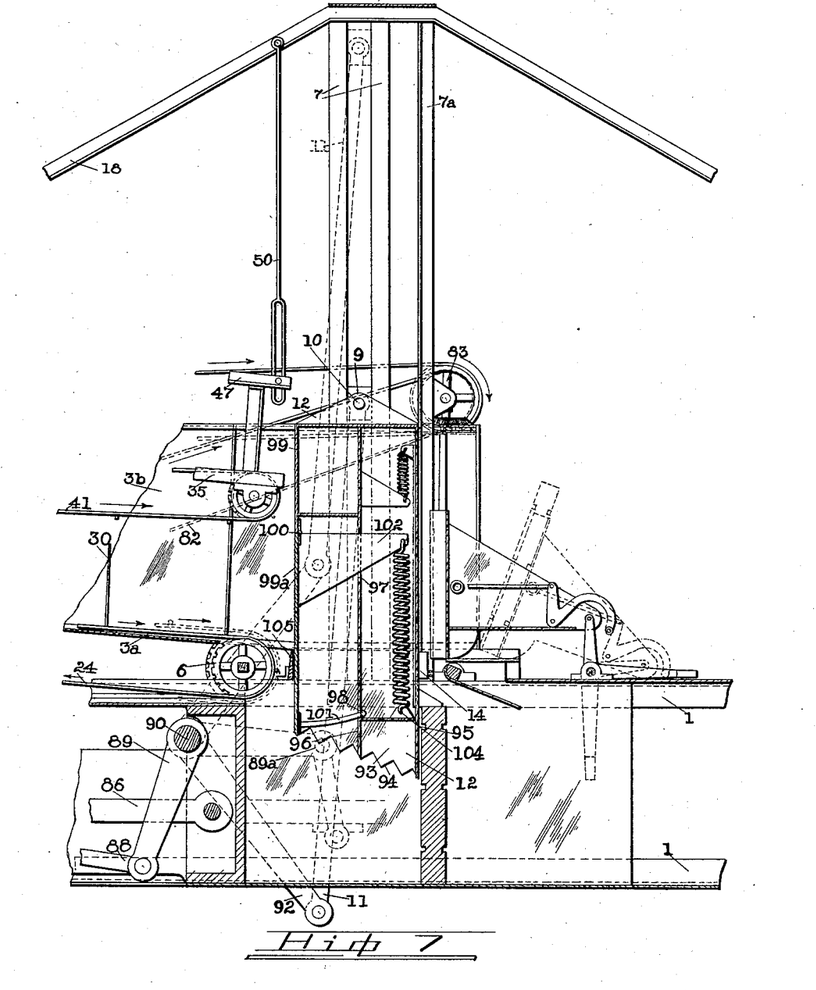
Fig. 7 is a vertical sectional view of the plunger, made lengthwise of the machine.
Figure 8:
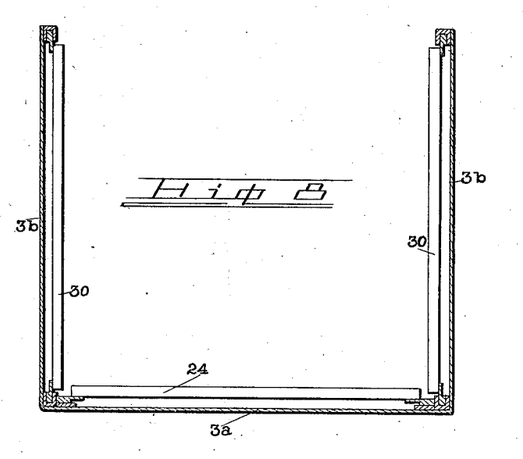
Fig. 8 is a cross section of the feed carriers and frame.
Figure 9:
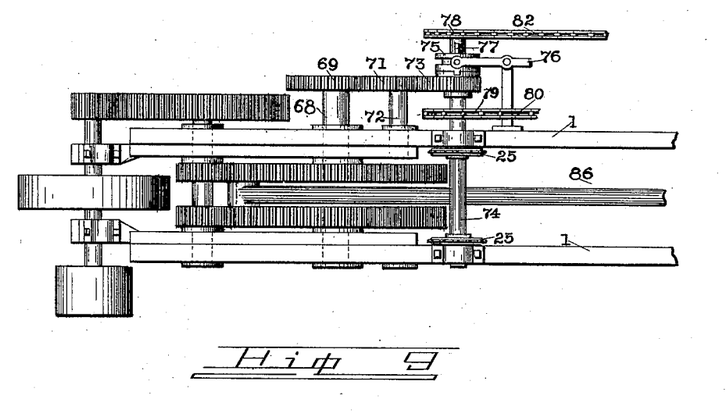
Fig. 9 is a plan view of the driving mechanism.
Figures 10, 11:
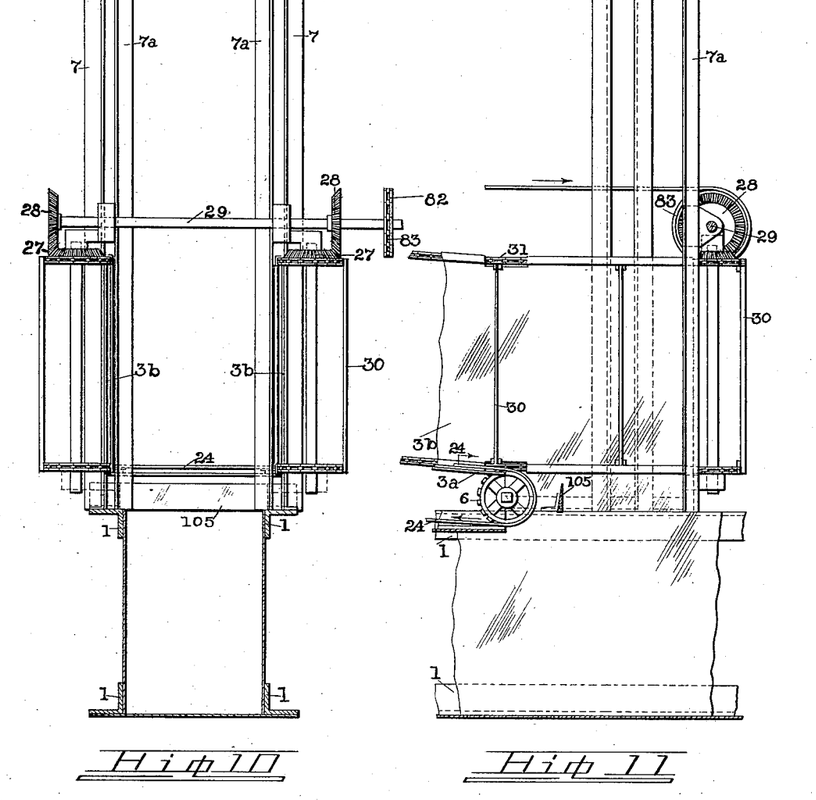
Fig. 10 is a cross section of Fig. 6 on the line A—B.
Fig. 11 is a longitudinal section of Fig. 6 on the line $x$—$y$.

In the drawing (Fig. 1), 1 represents a baling press of any usual construction, upon which is mounted my improved feeding attachment 2. This attachment consists of the casing 3, made of sheet metal, and secured upon said frame 1, in any usual manner. The sheet metal casing or frame 3 consists of a bottom portion $3^a$, made approximately 18 inches wide, the sides $3^b$ of which are preferably 24 inches in width, rise gradually from a horizontal position, at the front end, to a vertical position at the rear, where the bottom portion ends, at the feed opening, while the vertical sides extend slightly beyond that opening, as seen most clearly in Fig. 7, there being a depending portion from said sides along said opening, by means of which the casing 3 is secured to the frame work 1. Near the middle point of the feed opening is secured the vertical angle irons 7, at each side thereof, outside of the casing 3, and also to the frame 1. These guide-irons extend a considerable distance above the casing and are sustained by a cross plate 8, at the top. Near the rear corner of the feed opening, at each side, is a similar angle iron $7^a$, which is secured to the frame 1, at the bottom and to the plate 8, at the top. Between the angle irons 7 are guide-blocks 9, mounted to vertically reciprocate therein, and carrying the transverse shaft 10, to which is pivotally secured the drive bar 11. Between the blocks 9, on the shaft 10 is mounted the feed plunger 12. To the rear side, and at the bottom of the plunger are fastened guide-blocks 14, each having a projection 15, to engage behind the angle iron.

At the front end of frame 1, are secured braces 16, extending upwardly and fixed to the angle iron 17, which is arranged across the front end of the casing 3, each brace being secured thereto at its respective side. From the point of support of said braces 16, extend the braces 18, rearwardly, each one being secured to the side of the casing 3, thence to the top of bars 7 and $7^a$ where it is firmly secured, and from there it extends to the rear of the frame 1, thereby forming a truss for the support of the rear of the baler frame, to prevent it from sagging.

At the front edge of the feed opening is mounted a shaft 4, in the bearings 5, upon the frame 1. Upon this shaft is mounted two sprocket gears 6, at the respective edges of the bottom $3^a$, of the casing, so that the rim of the wheels will stand slightly above the flooring, portions thereof being cut away for the purpose. A shaft 22 is mounted across the front end of the flooring $3^a$, carrying sprockets of flanged pulleys 19, at each end corresponding in position to that of wheels 6. These shafts are adjustably secured in suitable bearings, in any usual manner. Upon the sprockets 6 and 19 is placed a sprocket chain, at each side, said chains being continuous and provided with transverse slats, at suitable intervals, thereby forming a conveyer 24. At an intermediate point beneath the flooring $3^a$, is provided suitable carrying sprockets or rollers 25, which are free to revolve on their axis, to support the conveyer in its return portion. A similar shaft $22^a$ is mounted in a similar manner at the front end of each side member $3^b$ of the casing; and at the rear end thereof, which is at the rear side of the feed opening, are mounted vertical shafts 26, having a sprocket near each end, corresponding in position, with reference to the sides of the casing, with said front sprockets. At the upper end of shafts 26 are provided bevel gears 27, meshing with similar gears 28, mounted on shaft 29 extending across the frame and having its bearing on the guide bars 7ª. Sprocket chains are mounted on the sprocket shafts 22ª and 26, and are provided with cross slats 30, thereby forming a conveyer upon each side member 3ᵇ. At the top of each side member, in front of the feed opening, is secured a sprocket or roller 31, against which the upper sprocket chains bear, in moving from the preceding inclined portion to the rear of the vertical portion standing along side the feed opening.

At an intermediate point, on the top of the casing, is mounted the shaft 32, in the bearings 33, and carrying at its end the driving sprocket 34. Angle irons 35 are pivotally secured on said shaft, inside the casing, upon the double bearing 35ª, and extend approximately to the feed opening. In said bearings 35ª is mounted the shaft 37, immediately to the rear of shaft 32, and the brackets 58 bearing thereon, rise to support the frame 57. Upon the end of shaft 37 is a spur gear 38 meshing with a similar gear 39 on shaft 32. Intermediate of the irons 35, upon the shaft 37 are mounted sprockets 40, carrying sprocket chains 41, which operate over corresponding sprockets 42 on the shaft 43, carried in adjustable bearings 44, at the rear end of the angle irons 35. At an intermediate point in said irons 35, is secured the transverse iron forming the arch 45, and at the rear end is formed a similar arch 46. To the upper side of these arches are fixed the parallel bars 47, which are slightly separated and carry at the rear end of the pin 48, moving in the loop 49 of the vertical bar 50, attached at its upper end to the braces 18. On the upper edge of said bars 47 are formed notches 51 to engage the balance 52. Between said bars, in a pivotal bearing 53, is mounted an adjusting screw shaft 54, having at its upper end a hand wheel 55. The lower end of the shaft engages in a pivoted nut 56 secured in the angle iron frame 57. Upon one end of the shaft 37 is loosely mounted the large gear 59 having formed integrally therewith, the small sprocket 60. The gear 59 meshes with pinion 61 secured upon shaft 32. Upon the sprocket 60 operates sprocket chain 62, which engages the large sprocket 63, mounted on the shaft 64 carried in bearings 65, mounted near the front end of frame 57. Upon the shaft 64 between the bearings 65, is provided a drum 66 carrying a plurality of curved spring teeth 67. Upon the plunger crank shaft 68 is mounted an elliptical gear 69 meshing with a similar elliptical gear 71, mounted loosely on shaft 72, and meshing with a third elliptical gear 73 free to revolve on the shaft 74, except when engaged with clutch 75, operated by the hand lever 76. The clutch is mounted on a feather key 77, in the shaft 74, and by its engagement with the elliptical gear the sprockets 78 and 79 will be set in motion. From sprocket 79 the chain 80 runs over sprocket wheel 81, secured upon shaft 4, thereby driving conveyer 24. Sprocket wheel 78 carries chain 82, running over sprocket 83 mounted on cross shaft 29, and driving side conveyer 30. Upon the end of said shaft 29 is mounted a sprocket 84 carrying the chain 85, which engages the sprocket 34, driving the feed controller mechanism. Near the rear end of the plunger rod 86 is pivotally secured in a proper bearing, link 88, to the opposite end of which link is similarly secured the arm 89, fixed upon the shaft 90, which is mounted in the bearings 91, attached to the baler frame 1. To each end of said shaft is fixed an arm 92 carrying at their ends links or shafts 11 pivotally connected to shaft 10 upon which the feed plunger 12 is formed. Toward the ends of the shaft 10 are fixed guide-blocks 9 adapted to move between the guide-bars 7. Between said blocks 9, upon said shaft is suspended the feed plunger 12, consisting of sheet metal side members 93, secured upon the shaft 10 and having rearwardly inclined bottom edges provided with saw teeth 94. The rear side 95 of the plunger is similarly formed and has teeth formed on a line with those at the rear edge of side members 93. At the median point of the plunger is fixed a transverse member 96, similar to the rear member and provided at its bottom edge with saw teeth. Near its middle point is formed a vertical slot 97 and toward its bottom is formed an aperture 98. The front member 99 has its upper portion rigidly fixed to the side members 93 and the lower portion 99ª is hinged thereto at 100, the lower edge being provided with teeth formed in line with those at the front edge of side members 93. To the inner face of the member 99ª, at the bottom is secured a bar 101 passing through the aperture 98, on the end of which is formed a head to engage the member 96 to limit the outward movement of the member 99ª to the front line of the side members 93. To the upper end of member 99ª is fixed an arm 102 projecting rearwardly through the slot 97, in the outer end of which is engaged a spring 103, which is anchored in the support 104 at the bottom of the plunger, the purpose of the spring being to hold the member 99ª in its outward position, against the pressure of material from the carrier.

Upon the frame 1 is fixed the cross bar 105 at the front edge of the feed opening, on a line slightly below the bottom conveyer 24, so as not to obstruct the forward movement of the material. Saw teeth are formed at the upper edge of said bar and are adapted to engage the material as it is forced downward by the feed plunger, and coöperating with the teeth on the member 99ª, they separate a portion of material to be carried into the compression chamber.

Figures 3, 4:
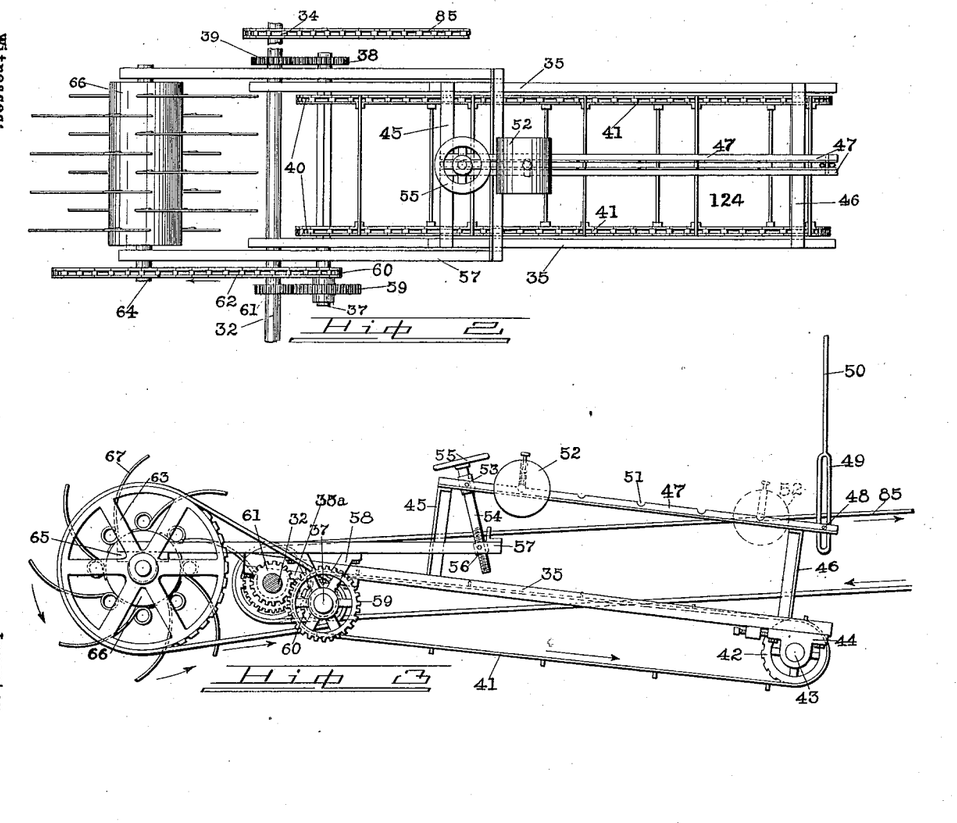
Fig. 3 is a side elevation of same.
Fig. 4 is a front end view of the carriers.
Figure 3:
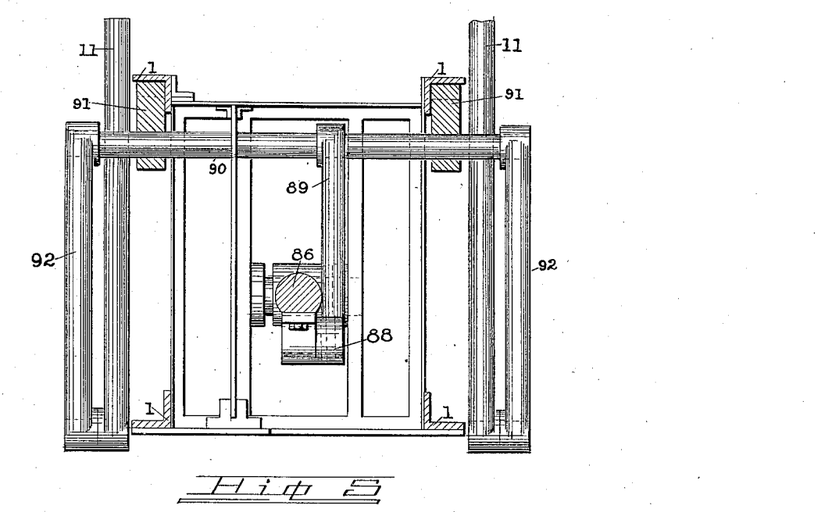
Figure 4:
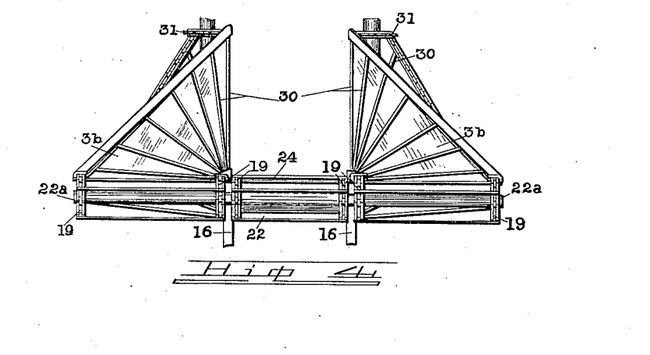
Figure 5:
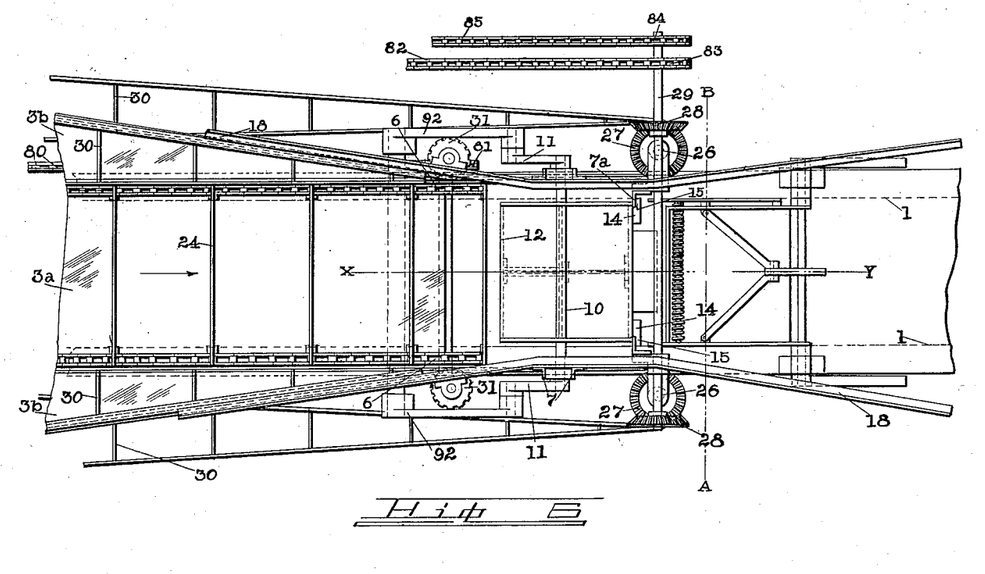
Fig. 5 is a transverse sectional view, showing the driving mechanism for the feed plunger.

When in operation, the loose material is placed upon the carriers, (see Fig. 1), which are revolving on their shafts, carrying the hay toward the feed opening. As the material moves forward, the gradually rising and converging outer edges of the side carriers, partially compress it, ready to be forced into the feed opening. At the upper portion of the casing 3 is pivotally mounted in bearings 33, a feed controlling device, seen in detail in Figs. 2 and 3. As the hay advances the high portions will come in contact with the slowly revolving retarders 67, which intercept temporarily the upper portion but allow the lower portion to continue, thereby equalizing the material in the carrier from that point to the feed opening. The weight 52 is arranged on the bar 47, to hold the retarder controller in contact with the hay. Upon this controller frame is mounted the conveyer 124, to keep the upper portion of the hay moving forward. By adjustment of the weight and the hand wheel 55, the amount of material passing through the carrier is controlled, by the relative raising and lowering of the retarder and retarder controller, which move together on shaft 32. When the material is brought by the carrier under the controller, at the rear end, the material raises the controller frame, rocking it with the retarder on the shaft 32, so as to cause the teeth 67 to engage deeper into the oncoming material, retarding it till the rear end of the carriers have been partially relieved, when that end will fall again raising the retarder. The carriers and retarder are driven by the elliptical gears 69, 71 and 73. The movement of these gears is so timed that the rapid motion of the carriers takes place at the time the feed plunger is near the upper limit of its travel, thereby quickly delivering the hay into the feed opening. The movement of the carriers then gradually decreases to a slow motion, during the descent and return of the feed plunger. When the link 88 passes under the pivot point 89ª, which occurs at the instant the rod 86 passes its forward center, the feed plunger is at the upper limit of its movement. As these elements each pass over these several points, their respective periods of comparative inactivity will be multiplied and imparted to the feed plunger, thereby causing it to remain stationary, at its upper limit for a considerable time. As above stated, the carriers are operated most rapidly during this interval, by the elliptical gears, thereby quickly filling the feed opening, ready for the plunger, in its descent.

Having described my invention, what I claim, is—

1. The combination with a baling press of a conveyer having side members which converge toward the feed opening,—carriers revolving on said side members,—and means actuated by the baling press for operating the carriers.

2. The combination with a baling press of a carrier for conveying material to the feed opening, consisting of a casing having a horizontal bottom member and side members which rise from a horizontal position at front to a vertical position at the rear,—shafts mounted to revolve therein,—conveyers mounted on the shafts,—and means actuated by the baling press for operating the shafts.

3. The combination with a baling press of an automatic feeder, consisting of a casing having a horizontal bottom member leading to the front of the feed opening, and a member at each side, the front end of which is positioned horizontally, the outer edges inclining upwardly to a vertical position, at the rear end of the bottom portion, whence they extend to the rear of the feed opening,—transverse shafts mounted at each end of said bottom and side members,—carriers mounted to revolve on said shafts,—and means actuated by the baling press for operating said shafts.

4. The combination with a baling press of an automatic feeder for carrying material to the feed opening, consisting of a casing, the side members of which incline from a horizontal position at the front end, to a vertical position at the rear,—shafts mounted at each end of the casing,—carriers revolving on said shafts,—means actuated by the baling press for operating said shafts,—and means for disconnecting the operative mechanism.

5. The combination with a baling press of a device for conveying material to the feed opening, consisting of a casing,—shafts mounted therein,—conveyers revolving on the shafts,—automatically adjustable means secured upon the casing for distributing the material therein,—and means actuated by the baling press for operating said shafts and distributing means.

6. The combination in a baling press of a carrier consisting of a casing for conveying material to the feed opening,—an automatically adjustable retarder mounted at an intermediate point thereon,—shafts mounted in the casing,—conveyers revolving on said shafts,—and means actuated by the baling press for operating the shafts and retarder.

7. In a self feeding attachment for hay presses and the like, a conveyer,—a shaft mounted transversely at an intermediate point thereon,—a retarder pivotally mounted on said shaft,—and means actuated by the material for lowering said retarder.

8. In a self feeding attachment for hay presses and the like, a conveyer,—a shaft mounted transversely at an intermediate point thereon,—a frame work pivotally mounted on said shaft,—a retarder mounted to revolve at the front end of the frame work,—a retarder-controller mounted on said shaft and extending to the rear thereof and adapted to be vibrated by the material in the conveyer,—means for adjusting the relative heights of the retarder and its controller,—and means actuated by the press for rotating the retarder.

9. An automatic feeder for baling presses and the like, comprising a casing,—a conveyer revolving therein,—a transverse shaft mounted intermediately of the casing,—a two-part frame pivotally supported on said shaft,—a retarder mounted to rotate at the front end thereof,—a retarder controller adapted to be raised by the material in the conveyer, mounted to revolve at the rear end of the frame work,—means for adjusting the two-part frame, whereby the ends are relatively raised and lowered,—and means for limiting the rotation of the frame work on its pivotal support.

10. In a self feeding attachment for hay presses and the like, a casing,—a conveyer revolving therein,—a shaft carrying gear wheels mounted transversely at an intermediate point in the casing,—a frame work having a bearing on the shaft and extending toward the rear of the conveyer,—a shaft mounted on said frame work carrying gears meshing with those of the first mentioned shaft,—brackets bearing on the second mentioned shaft,—a frame work secured on the brackets, and extending forward of their pivotal support,—a retarder mounted to revolve at the extremity thereof,—an adjusting mechanism connecting the rear end thereof to the first mentioned frame, whereby the extremities of the two frames are relatively raised and lowered,—and a balance for depressing the rear end of the frame, for causing the retarder to disengage from the material in the conveyer.

11. The combination with a baling press of a conveyer for carrying material to the feed opening, an automatically adjustable feed-control mounted upon the conveyer,—a frame work formed about the feed opening,—a feed plunger reciprocating therein,—and means actuated by the press for operating the conveyer and feed plunger.

12. The combination with a baling press of a conveyer for carrying material to the feed opening,—a frame work formed about the feed opening,—a feed plunger reciprocating therein,—and means actuated by the baling press for simultaneously operating the conveyer and feed plunger so that the former will move rapidly during the upper portion of the movement of the latter and slowly during the movement in its lower portion.

13. The combination with a baling press of a carrier frame having a horizontal flooring leading to the feed opening and side members which are horizontal at their front ends, the outer edges of which rise gradually to a vertical position, at the rear of the bottom member, whence they extend to the rear of the feed opening,—shaft mounted to rotate at each end of each member,—carriers revolving on said shafts,—a vertical frame work formed at the feed opening,—a feed plunger reciprocating therein,—and means actuated by the baling press for simultaneously operating said shafts and feed plunger.

14. The combination with a baling press of a carrier frame having bottom and side members, the latter being expanded at the front end and gradually converge to the rear of the bottom member at the feed opening carriers revolving on said bottom and side members whereby the material is condensed at the feed opening,—an elliptical gear mechanism mounted on the press and operatively connected with the carriers,—a vertical frame mounted at the feed opening,—a feed plunger reciprocating therein,—a link mechanism mounted on the press and operatively connected with the feed plunger,—and means actuated by the baling press for operating said gear and link mechanisms, whereby the carriers will move rapidly during the upper portion of the plunger's movement and slowly during its lower portion.

15. In a baling press, a frame work forming a compression chamber having a feed opening in its upper side,—a plunger reciprocating in said chamber,—a vertical frame formed on the press about said opening,—a feed plunger reciprocating therein,—rafters secured to the front and rear ends of the baler frame and suspended intermediately over said vertical frame, for supporting the rear end of the former,—a casing secured to the vertical frame above the baling press,—shafts mounted to rotate therein,—conveyers revolving on said shafts,—a variable operating mechanism mounted on the baling press, connected with said shafts,—a link mechanism mounted on the baling press and pivotally connected with the compression plunger and with the feed plunger,—and means actuated by the press for simultaneously operating the variable mechanism and compression plunger.

16. In a baling press, a frame forming a horizontal compression chamber having a feed opening in its upper side,—a plunger reciprocating in the chamber,—a vertical frame secured to the baling press about the feed opening,—a plunger reciprocating therein,—carriers mounted on the baling press for conveying material to the feed opening,—means fixed at the front of the feed opening for dividing the material,—a link mechanism connecting the compression plunger with the feed plunger,—and means actuated by the baling press for simultaneously operating the carriers and plungers.

17. In a baling press, a horizontal frame work forming a compression chamber having a feed opening in its upper side,—a plunger reciprocating therein,—vertical guide-ways secured at each side of the feed opening,—a feed plunger reciprocating therein,—a drive shaft pivotally secured to the feed plunger,—a crank shaft mounted on the horizontal frame work,—a fixed arm pivotally connecting the drive shaft therewith,—another arm rigidly fixed on said drive shaft,—a link pivotally connecting the latter arm with compression plunger,—and means actuated by the press for operating said plunger.

18. In a baling press, a horizontal frame work forming a compression chamber having a feed opening in its upper side,—a bar provided with upwardly projecting teeth secured at the front edge of the feed opening,—a vertical guide-way secured at each side of the feed opening,—a feed plunger reciprocating therein, said plunger being provided at its lower end with downwardly projecting teeth and with a front member yieldingly held in place,—and means actuated by the baling press for operating the plunger.

19. A feed plunger for baling presses and the like, comprising a short front member, pivotally supported,—a long back member, and side members conforming thereto, the lower ends of each being serrated,—a transverse central member having a central vertical slot and an aperture in line therewith at its lower end,—an arm secured to the upper end of the hinged front member, projecting through said slot,—a bar secured to the lower end of the front member and extending through said aperture, for limiting the movement of the hinged member,—a spring connecting the end of said arm to the back member for holding the front member normally in position,—and a shaft secured to the upper end of the plunger, whereby the same is operated.

20. A feed plunger for baling presses and the like, comprising a pivoted front member, and fixed back and side members having means at the lower ends for engaging the material operated on,—means for yieldingly holding said front member in normal position,—and means secured to the upper end of the plunger, whereby it is operated.

In testimony whereof I affix my signature in presence of two witnesses.

NORRIS W. YOUNG.

Witnesses:
EDWIN E. HECKBERT,
E. BERG.

---

Copies of this patent may be obtained for five cents each, by addressing the "Commissioner of Patents, Washington, D. C."